United States Patent [19]

Boone et al.

[11] Patent Number: 4,713,661

[45] Date of Patent: Dec. 15, 1987

[54] TRANSPORTATION VEHICLE LOCATION MONITOR GENERATING UNIQUE AUDIBLE MESSAGES

[75] Inventors: Joseph E. Boone; W. Bruce Ahlemeyer, both of Indianapolis, Ind.

[73] Assignee: Regency Electronics, Inc., Indianapolis, Ind.

[21] Appl. No.: 766,607

[22] Filed: Aug. 16, 1985

[51] Int. Cl.$^4$ ............................................... G08G 1/12
[52] U.S. Cl. .................................. 340/994; 340/539; 340/991; 364/436
[58] Field of Search ................................ 340/991–994, 340/988, 996, 539; 180/168; 342/457; 364/436, 460, 424; 455/49, 99; 179/2 E, 2 EB

[56] References Cited

U.S. PATENT DOCUMENTS

| | | | |
|---|---|---|---|
| 3,020,522 | 2/1962 | Lesher . | |
| 3,114,127 | 12/1963 | Ramsey . | |
| 3,167,282 | 1/1965 | Hursh et al. . | |
| 3,416,129 | 12/1968 | Dean . | |
| 3,644,883 | 2/1972 | Borman et al. | 340/991 |
| 3,646,580 | 2/1972 | Fuller et al. | 340/993 |
| 3,714,574 | 1/1973 | Baba et al. . | |
| 3,718,899 | 2/1973 | Rollins . | |
| 3,818,345 | 6/1974 | Miya et al. . | |
| 3,886,515 | 5/1975 | Cottin et al. | 340/994 |
| 4,009,375 | 2/1977 | White et al. | 340/988 |
| 4,041,393 | 8/1977 | Reed . | |
| 4,220,946 | 9/1980 | Henriot | 364/436 |
| 4,297,672 | 10/1981 | Fruchey et al. | 340/994 |
| 4,307,859 | 12/1981 | Hayashi et al. | 340/994 |
| 4,325,057 | 4/1982 | Bishop | 340/994 |
| 4,350,969 | 9/1982 | Greer | 340/994 |
| 4,481,584 | 11/1984 | Holland | 340/996 |

Primary Examiner—James L. Rowland
Assistant Examiner—Brent A. Swarthout
Attorney, Agent, or Firm—Woodard, Emhardt, Naughton, Moriarty & McNett

[57] ABSTRACT

A transportation vehicle alert monitor incorporating a speech synthesizer for voice announcement of vehicle location by stop number. The monitor includes a radio receiver responsive to coded RF signals containing either current vehicle location data or data for programming the monitor. Current location data includes school system number, bus number, route number, and stop number. Programming data includes school system number, monitor serial number, student number, two route numbers for one bus number, and initial and final alert stops for each route. Programability of initial alert stops allows each alert monitor to be remotely adjusted to allow varying conditions including the discharge between adjacent stops, traffic conditions, and distance from a passenger's house to the stop.

9 Claims, 6 Drawing Figures

TRANSPORTATION VEHICLE LOCATION MONITOR GENERATING UNIQUE AUDIBLE MESSAGES

BACKGROUND OF THE INVENTION

This invention relates to vehicle monitoring systems, and particularly to alert and warning systems for monitoring the location of the vehicle on a transportation route having a plurality of stops from a location proximate to a designated stop on the route.

Transportation systems such as municipal and school bus systems have for years operated according to schedules of stop locations and times which are either conveyed individually to intended passengers or published for the general public. Since buses often depart from their schedules, bus riders depending only on bus schedules must adjust their own schedules to allow for early or late arrival of their bus. These schedule adjustments not only increase the effective riding time for any bus rider, but they increase an individual's exposure to inclement weather and, in some localities, to the risk of harassment or harm from other individuals. School buses, particularly those involved in transportation of handicapped students, sometimes wait for late arriving students. This not only wastes fuel but directly increases the riding time for all the riders on the bus.

An early warning system devised by Fruchey et al., described in U.S. Pat. No. 4,297,672, includes a radio transmitting system on a bus and a plurality of receiving systems in proximity to individual predesignated pickup regions. The transmitter on the bus broadcasts an RF signal sequentially modulated by a plurality of audio frequencies generated by individual tone generators. Each receiver has a corresponding plurality of tunable tone decoders, and any receiver which is set to respond to the particular multi-tone sequential signal being broadcast provides an audible and visual alarm upon receipt of that signal. This system can provide early warning only to passengers to be picked up by a bus at the immediately upcoming stop. In some situations, such as where stops are located close to each other, advance notice of only one stop does not give a passenger sufficient time to travel to the bus stop to meet the arriving bus. This system is also inconvenient for the bus driver, who must operate a plurality of tone selector switches at each stop to set the particular ordered combination of audio frequencies to uniquely identify the immediately upcoming stop.

In a radio signaling system for monitoring transportation vehicles, it is sometimes necessary to change route or stop designations to accommodate changing transportation conditions. It would be advantageous in such cases to be able to change desired parameters without requiring the involvement of the owner of any individual receiver. This would eliminate inconvenience to private individuals such as parents of school children who ride a school bus in the system, and minimize the inconvenience of the system operator in reprogramming receivers.

SUMMARY OF THE INVENTION

The present invention overcomes these and other disadvantages of the prior art by providing a transportation vehicle monitor having a memory for storing data corresponding to a stop designated for the apparatus and for storing initial stop data corresponding to a preselected stop prior to that designated stop. A receiver responds to a coded signal containing stop data representing the current location of the vehicle, and the apparatus generates an initial alert signal when the current stop data corresponds with the initial stop data and generates a second alert signal when the current stop data corresponds with the designated stop data. In response to the initial alert signal, a speech synthesizer synthesizes a message indicating the presence of the vehicle at the preselected stop prior to the designated stop, and in response to the second alert signal, the speech synthesizer synthesizes a message indicating the presence of the vehicle at the designated stop.

It is a general object of the present invention to provide an improved transportation vehicle monitor.

Another object of the invention is to provide a transportation vehicle monitor which provides warning of an approaching transportation vehicle more than one stop away from the stop designated for the monitor.

Yet another object of the invention is to provide audible announcement of a message indicating the location of a transportation vehicle without transmitting an audio signal.

Another object of the invention is to provide a remotely programmable transportation vehicle monitor.

These and other objects and advantages of the present invention will become more apparent and fully understood from the following detailed description taken in conjunction with the accompanying drawings.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
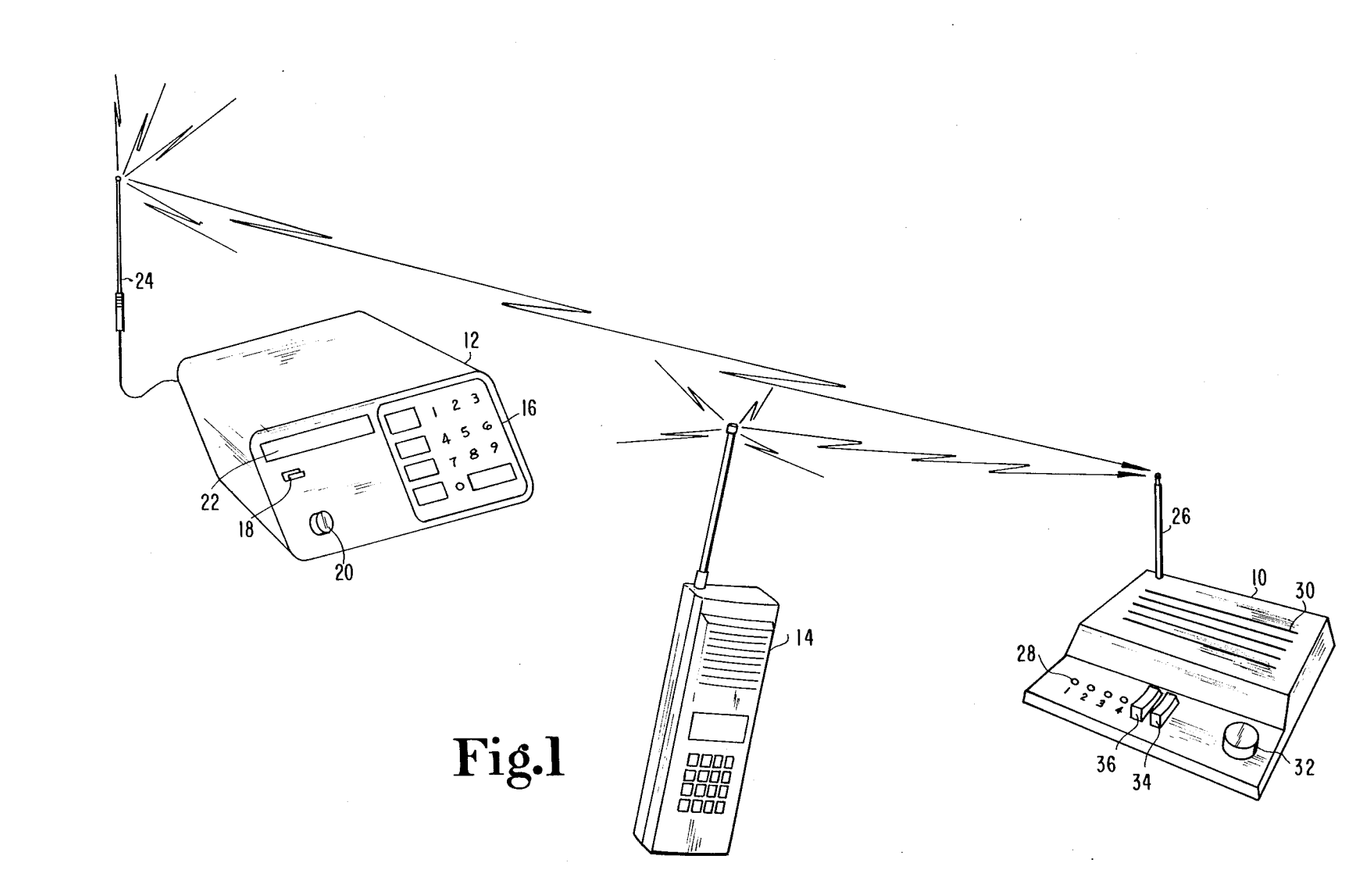
FIG. 1 is a perspective view of a system incorporating the preferred embodiment of the transportation vehicle monitor according to the present invention.

Referring now to FIG. 1, an alert monitor, or receiver, 10 according to the present invention is shown in its operational relationship with a transmitter 12 and handheld remote programmer 14. Receiver 10 is responsive to frequency-shift keyed (FSK) RF signal transmissions from either transmitter 12 or programmer 14. The preferred embodiment of the invention will be described herein in terms of a school bus transportation system, although it will be readily understood by those skilled in the art that the principles of the invention are equally applicable to other types of transportation systems. Each school bus in the system is equipped with a transmitter 12 designed for communications with a receiver 10 located in a student residence for alerting parent and student as to bus location in adequate time for the student to leave home and travel to his designated stop. A bus driver transmits the current location of the bus from transmitter 12 to all receivers 10 within range of the transmitter. Operation of transmitter 12 is controlled through keyboard 16, PROGRAM/RUN switch 18, and control knob 20 which is a combined ON/OFF switch and volume control. Transmitter 12 additionally includes a front panel display 22. The operation of transmitter 12 will be described in greater detail hereinafter. FSK-modulated radio signals are transmitted from transmitter 12 by way of antenna 24 and are received on the antenna 26 of any receiver 10 in range of the transmitter. Receiver 10 receives and demodulates the transmitted signal and processes the incoming data. If there is a correspondence between incoming data and data stored in its memory, receiver 10 alerts a student of the proximity of the bus by flashing a corresponding light-emitting diode (LED) 28 and by announcing the current location of the bus in a synthesized voice through speaker 30. Receiver 10 is additionally provided with a control knob 32 for volume control, a pushbutton ON/OFF switch 34, and a REPEAT switch 36. When REPEAT switch 36 is pressed, receiver 10 repeats the last message it has announced.

Receiver 10 can be programmed for a system number, four student numbers, bus number for each student, two route numbemrs for each bus, and initial and final alert stops for each route, and all these parameters are programmed into the receiver through an FSK-modulated radio signal transmitted from handheld remote programmer 14.

Figure 2:
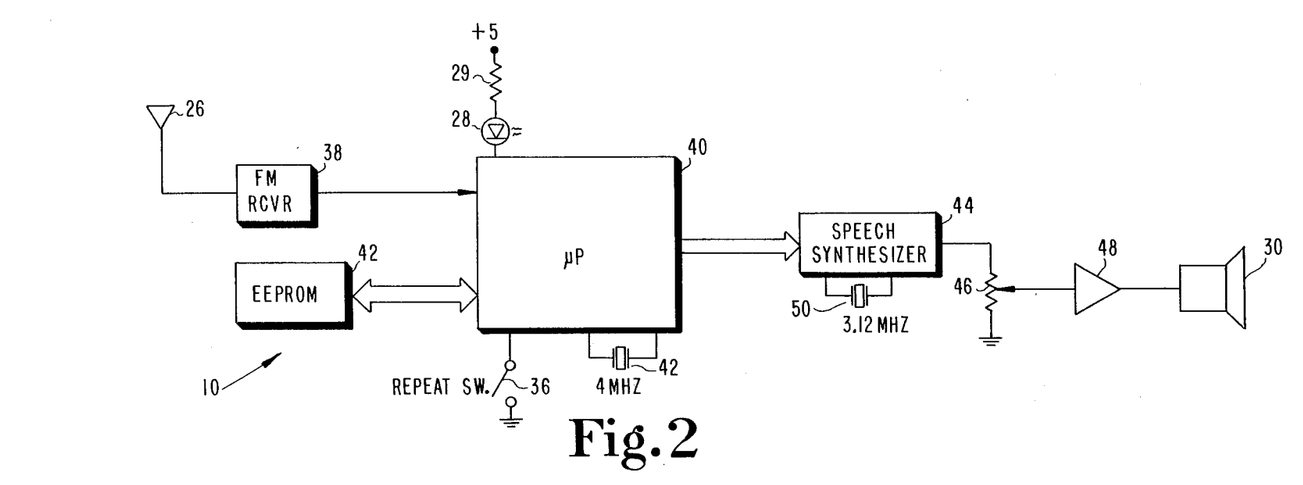
FIG. 2 is a block diagram of one embodiment of a transportation vehicle monitor according to the present invention.

Referring now to FIG. 2, the internal circuitry of receiver 10 is shown in block diagram form. An RF signal carrying a serial data stream is received on antenna 26 and decoded by an FM receiver 38. The data is supplied to a microprocessor 40 where it is processed under control of a program stored in an internal read-only memory (ROM) within the microprocessor. Coupled to microprocessor 40 for storage of programming data in an electrically erasable, programmable read-only memory (EEPROM) 42. Microprocessor 40 operates from a +5 VDC supply at a clock frequency of 4 MHz as determined by crystal 42. Each LED 28 is provided with a standard current limiting resistor 29 in series therewith. Microprocessor 40 provides visual alert signals through energization of an LED 28, and provides audible alert signals to speech synthesizer 44. Each alert signal contains data taken from memory by microprocessor 40 and representing a particular message to be synthesized by speech synthesizer 44. As depicted in FIG. 2, the block representing speech synthesizer 44 includes a low pass filter at the output thereof. The synthesizer output signal is supplied through a potentiometer 46 and audio amplifier 48 to speaker 30. Potentiometer 46 is controlled by control knob 32 on the front panel of the receiver.

FM receiver 38 is a conventional superheterodyne receiver comprised of an RF amplifier, mixer, and local oscillator circuitry, an IF amplifier and an FM demodulator. In the preferred embodiment, FM receiver 38 employs an MC3357 integrated FM-IF amplifier manufactured by Motorola. If a pure (unmodulated) carrier is received. the output of FM receiver 38 is continually in a logical-one (high) state. When the bus is out of range of a receiver, that receiver does not detect a carrier and the output of FM receiver 38 is random noise, i.e., random ones and zeroes. Transmitted data is distinguished from either of these types of output in a manner which will be described. DC coupling is provided between FM receiver 38 and the microprocessor. Microprocessor 40 is a Motorola 6805 microprocessor, and EEPROM 42 is an NMC9306 256-bit serial EEPROM commercially available from National Semiconductor Incorporated. The preferred embodiment of receiver 10 employs a General Instrument GIST0256 speech synthesizer operating with a 3.12 MHz clock as controlled by crystal 50.

Figure 3:
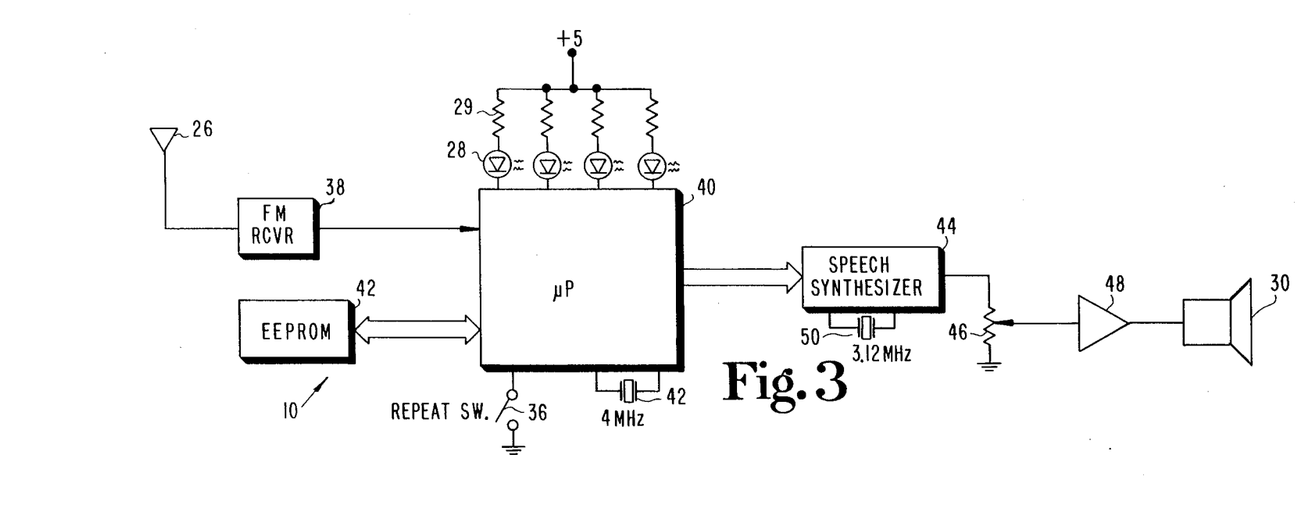
FIG. 3 is a block diagram of an alternative embodiment of the monitor shown in FIG. 1.

FIG. 3 shows an alternative embodiment of the alert monitor according to the present invention, including four LEDS 28 for individual alerting of up to four students. The EEPROM memory is mapped for individual students, that is, it includes separate memory locations for programming data for four individual students; programming data supplied to the memory is coupled to a particular memory location depending on the student number contained in the programming data words. It should be noted here that, in both embodiments, all LEDS in the receiver are normally on, to provide a visual verification that the receiver is operating, and visual alert indications are given by flashing an LED off either once or continually.

Figure 4:
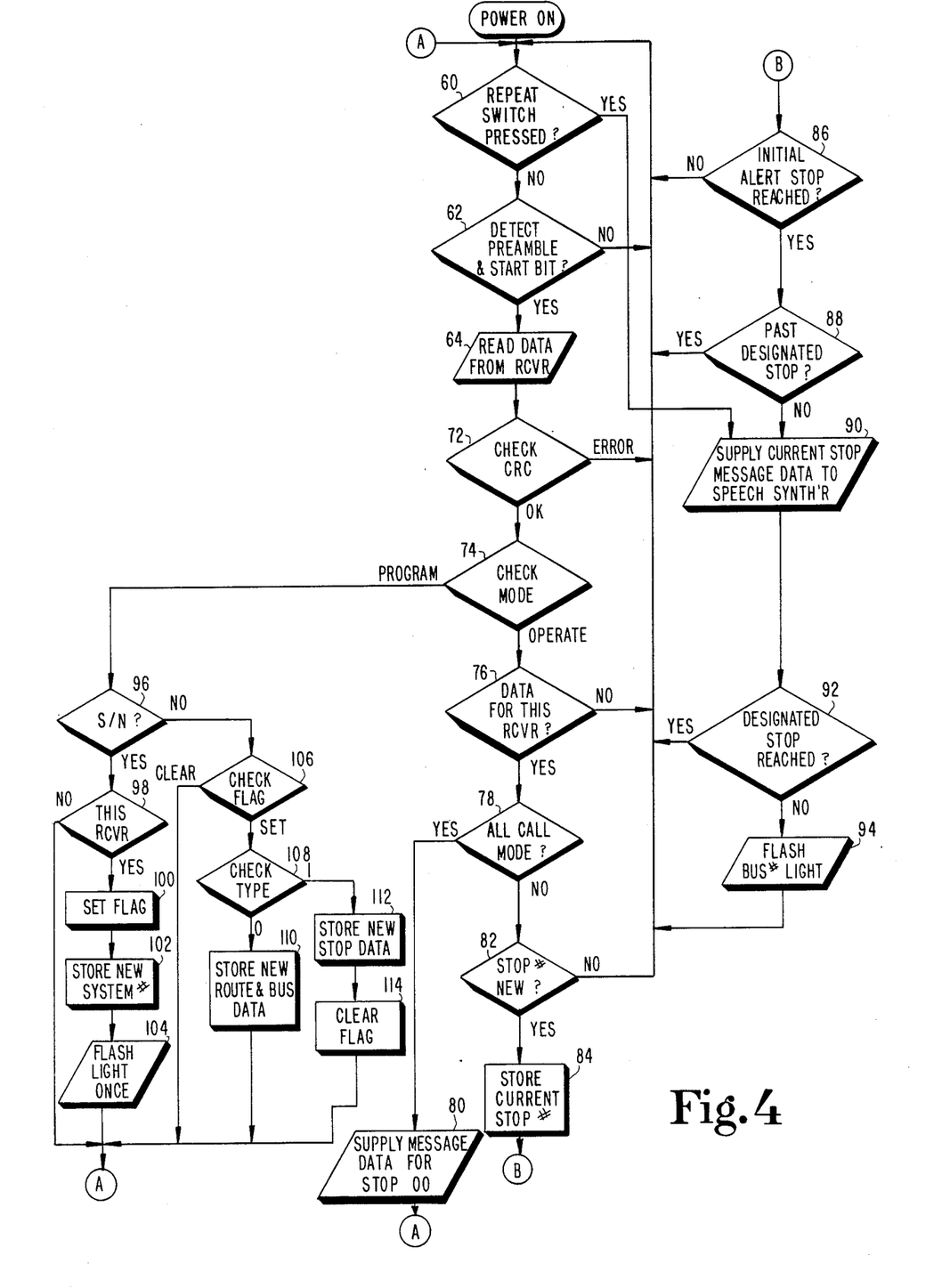
FIG. 4 is a flow chart of the program steps executed by the microprocessor in the monitor of FIGS. 2 or 3.
Figure 5:
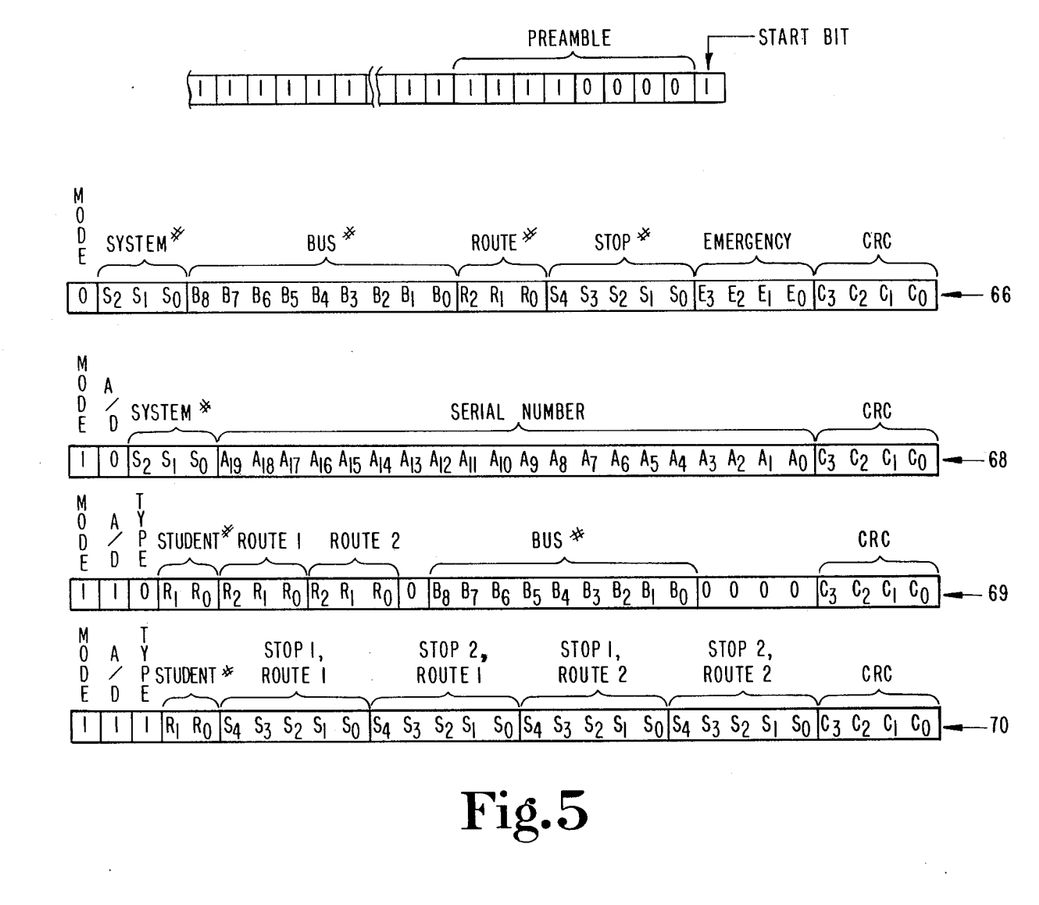
FIG. 5 depicts the data word formats recognized by the monitor of FIGS. 2 or 3.

As stated previously, microprocessor 40 operates according to a program stored in internal ROM. That program will now be described with reference to FIGS. 4 and 5. When power is turned on, the program begins to run and executes steps represented by decision blocks 60 and 62. In decision block 60, the microprocessor checks to see that the REPEAT switch is pressed, and in decision block 62 the microprocessor looks for a preamble and start bit in an incoming data stream. The program runs repetitively through these steps most of the time, waiting either for actuation of the REPEAT switch or for reception of a data word from the receiver. That is, most of the time the receiver switch is not pressed and no preamble or start bit is detected, and so the program runs in a loop from decision block 60 through decision block 62 and back to the beginning of decision block 60. The answer to the question in decision block 62 is yes anytime the microprocessor receives a preamble of four logical-one bits followed by four logical-zero bits, with the preamble followed by a start bit which is logical-one. FIG. 5 illustrates this relationship of preamble and start bit, which will be present immediately preceding each of the four data words in FIG. 5. As stated, FM receiver 38 outputs random noise in the absence of a received carrier signal, i.e., when the bus transmitter is out of range, but any data transmitted to the receiver is distinguishable from noise or a pure carrier by the preamble and start bit. Whenever a preamble and start bit are detected, microprocessor 40 reads the following data word from the receiver in step 64.

The incoming data word may be in any one of the four formats 66, 68, 69, or 70 illustrated in FIG. 5. The school system is assigned a system number (one of eight) so that systems within the same geographical area will not interfere with each other. Each bus is then assigned its own identifying number so that receivers can distinguish its transmissions from those of other buses in the area. Nine bits in the preferred data formats are assigned to bus numbers, for a maximum capability of 512 buses. Each bus can be assigned up to 8 different routes each having up to 32 stops. Thus, without interference, the data formats of FIG. 5 would enable a school bus alert monitor of the present invention to be used by up to 8 different school systems each having up to 512 buses operating on up to 8 routes per bus with up to 32 stops on each route. This maximum capability is not used, however, in order to provide for an ALL CALL feature, specifically, the ability to activate all alert monitors in range of the transmitter. 500 of the possible 512 bus numbers are actually usable for bus number assignments, and number 501 is used to designate ALL CALL mode. Four bits, labeled emergency bits in FIG. 5, are reserved for special message transmissions such as emergencies. Five bits in data word 69 are unused in the preferred embodiment.

The data read in is stored either in EEPROM 42 or in internal registers within the microprocessor: EEPROM 42 stores programming data and internal registers store current stop data. After reading in a data word, the microprocessor checks the cyclic redundancy code (CRC) bits to determine if the data word has been properly received or if there has been an error in transmission. The four CRC bits are generated at the transmitting end as a function of the values of the other bits in the data word, and the microprocessor operates on those other bits according to the same algorithm used at the transmitting end and generates a CRC code which corresponds with the received bit values. If the microprocessor generates the same CRC code as that in the received data word, it proceeds to step 74 in the program. If, on the other hand, there is an error in transmission detected by the microprocessor in step 72, processing of the received data ceases and program control branches back to step 60.

In step 74, the microprocessor checks the MODE bit, the first bit in the data word. If that bit is a zero, the receiver runs in the OPERATE mode. A MODE bit value of one represents PROGRAM mode. Thus, as can be seen in FIG. 5, data word 66 is an OPERATE mode data word and data words 68 to 70 are PROGRAM mode data words. The PROGRAM mode will be described in greater detail later. The next step performed in OPERATE mode, depicted by decision block 76, is to verify that the received data is intended for this particular receiver. If the answer is no, processing of that data ceases and programming control branches back to program step 60. If the answer is yes, the program proceeds to execute the steps represented by decision block 78. In decision block 76, the microprocessor first checks the system number ($S_0$–$S_2$) against the system number stored in memory, and likewise checks the incoming bus with the indicated number and route number to see if its memory indicates a bus number traveling on the indicated route.

In decision block 78 the microprocessor determines whether the receiver should operate in ALL CALL mode. If the received bus number is 501, the number designated for ALL CALL mode, the answer is yes and program control transfers to data output step 80. The microprocessor then supplies message data for stop number 00, and speech synthesizer 44 synthesizes the following message: "Bus is at stop 00." If the bus number is any number other than 501, the receiver is not in ALL CALL mode, and the microprocessor then checks, in decision block 82, whether the received stop number is new, i.e., whether it is different from the immediately preceding stop number received for the same system bus and route numbers received in the current data word and determined to be data for this receiver. The transmitter on board the bus repetitively transmits its current location so the current location data will be received by each receiver as soon as the bus transmitter comes in range. As a result of this, once the bus transmitter is in range of a particular receiver, that receiver repeatedly receives data including the same stop number. By the program as just described, the receiver announces the current bus location once per stop, although message repeats are possible by operation of the REPEAT switch, as will be described. If it is determined in step 82 that the stop number is not new, no further processing of the current data word is undertaken and program control reverts to step 60. If, however, the stop number is new, the next program operation, depicted by block 84, is to store that stop number as the current stop number.

The program next determines what if any alert indications should be provided in response to the currently incoming data word. This is depicted by the blocks in the far right column of FIG. 4. In step 86, the microprocessor determines whether the initial alert stop has been reached. In this step, the microprocessor compares the current stop number with an initial alert stop number which, as will be described, is stored in its memory for a particular bus traveling on a particular route within the system. No alert indications are given before the initial alert stop is reached. Accordingly, if the answer is no, program control reverts back to program step 60. If, however, the bus has reached the stop at which the initial alert indication is to be given, the next program operation, represented by decision block 88, is to determine whether the bus is past the designated stop, that is, the stop designated for the student who is alerted by the particular receiver. If the bus has not yet passed the designated stop, program control proceeds to output block 90, and the microprocessor supplies current stop message data to the speech synthesizer, which then synthesizes an audible message: "Bus is at stop X," where X represents the current stop number. If the bus is already at the next stop after the designated stop, the program control reverts back to step 60. If the designated stop has not been reached, as determined by the program steps represented by decision block 92, the bus number LED assigned to the particular student is caused to flash off and back on by the microprocessor, this being represented by data output block 94. Flashing of the bus number LED continues until the decision reached in block 92 changes, which occurs when the bus reaches the student's designated stop.

Thus, as the bus approaches and makes stops, a receiver remembers the current stop number and begins announcing the current bus location and flashing the corresponding bus number LED once it receives data indicating that the bus has reached the stop selected for initial alert indication. Each bus stop thereafter is announced once by the alert monitor, while the corresponding bus number LED flashes continually. Once the bus reaches the student's designated stop, the bus number LED ceases to flash and the alert monitor makes its final automatic current stop announcement. Anytime an operator with an alert monitor wishes to know the current location of the bus, he simply presses the REPEAT switch, which is detected by the microprocessor in decision block 60, and the microprocessor executes step 90, by supplying the current stop message data to the speech synthesizer whereby the last message will be repeated in sequence for each bus number. If the bus is out of range at this point the receiver will announce the last message it remembers, and if there is no message stored in a particular bus number's memory, the announced message is "Bus is at stop."

The programming routine for the alert monitor will now be described. Programming an alert monitor is accomplished by transmission of three programming data words 68, 69 and 70. The first step in the program routine is decision block 96, wherein the microprocessor, having determined that the received data word is a programming data word, determines whether the data word contains a serial number. The microprocessor does this by checking the state of the address/data (A/D) bit, which denotes whether the data word contains an address (serial number) or data. A zero (low logic state) represents a serial number, whereas a one (high logic state) represents data. If the A/D bit is low, the received word format is determined to be that of data word 68, and program control proceeds to decision block 98, wherein the bits $A_0$ to $A_{19}$ corresponding to the serial number are checked to determine if the received serial number matches that of the receiver. It should be noted here that the receiver's serial number is stored in the EEPROM at the time of manufacture and cannot be reprogrammed by a remote programmer. If the serial numbers do not match, the program branches out of the programming routine and back to step 60. If the received serial number is the serial number for the receiver in question, the microprocessor sets a flag in step 100, stores the system number in step 102 and flashes all bus LEDS once in step 104. The flashing LEDs provide a visual indication that the alert monitor has responded to addressing. These steps complete the processing for the one current received data word, and program control returns to the beginning of the program (step 60) to await another data word.

In the programming sequence, after a pause of approximately one second, the alert monitor receives a data word 69 followed, after another pause of approximately one second, by data word 70. As with all data words, these words are detected by the presence of a preamble and start bit, and they are separately processed. The processing of data words 69 and 70 is the same as that for data word 68 until step 96 in the program is reached. At that point, since the A/D bit is high, the microprocessor determines that the data word does not contain a serial number, and the program branches to decision block 106 wherein the status of the flag referred to in step 100 is checked. If the received data word 69 and 70 are intended for this receiver, the flag will be set at this time whereupon the microprocessor proceeds, in decision block 108, to check the type bit in the data word. Type zero identifies data word 69 whereas type one identifies data word 70. Accordingly, if the type bit is low, the new route and bus data are stored to complete processing of the currently received data word. If the flag is clear when checked in step 106, processing of the current data word ceases and the program branches back to step 60. Upon receipt of data word 70, the third word in the programming circuit sequence, the flag remains set if it was set already, and the next program operation is to store the new stop data, this being represented by block 112. As can be seen in the format for data word 70, the stop data consists of stops 1 and 2 for route 1 and stops 1 and 2 for route 2, all for one specified student. In step 114 the microprocessor clears the flag to complete processing of data word 70 and to complete programming of the alert monitor.

It is desirable to verify that the alert monitor has been correctly programmed, and accordingly, programmer 14 is equipped with the capability to transmit words in the format of data word 66. Upon receipt of such data words, alert monitor 10 responds as it would to any data word, in the manner as already described for OPERATE mode. Also, it will be appreciated that, since the alert monitor responds to a data word 68 individually, transmission of a single word in this format can be used to verify that the serial number indicated on the alert monitor name plate matches that stored in internal memory in the alert monitor. That is, a data word 68 transmitted to the alert monitor with the serial number indicated on the monitor's name plate will cause all bus LEDs to flash once if the serial number is correct. Both of these transmission features are preferably incorporated into handheld programmer 14. A programmer which is particularly suitable for use in the system described above is commercially available from Regency Electronics, Inc., the assignee of the present invention, as the model RP100 remote programmer.

Figure 6:
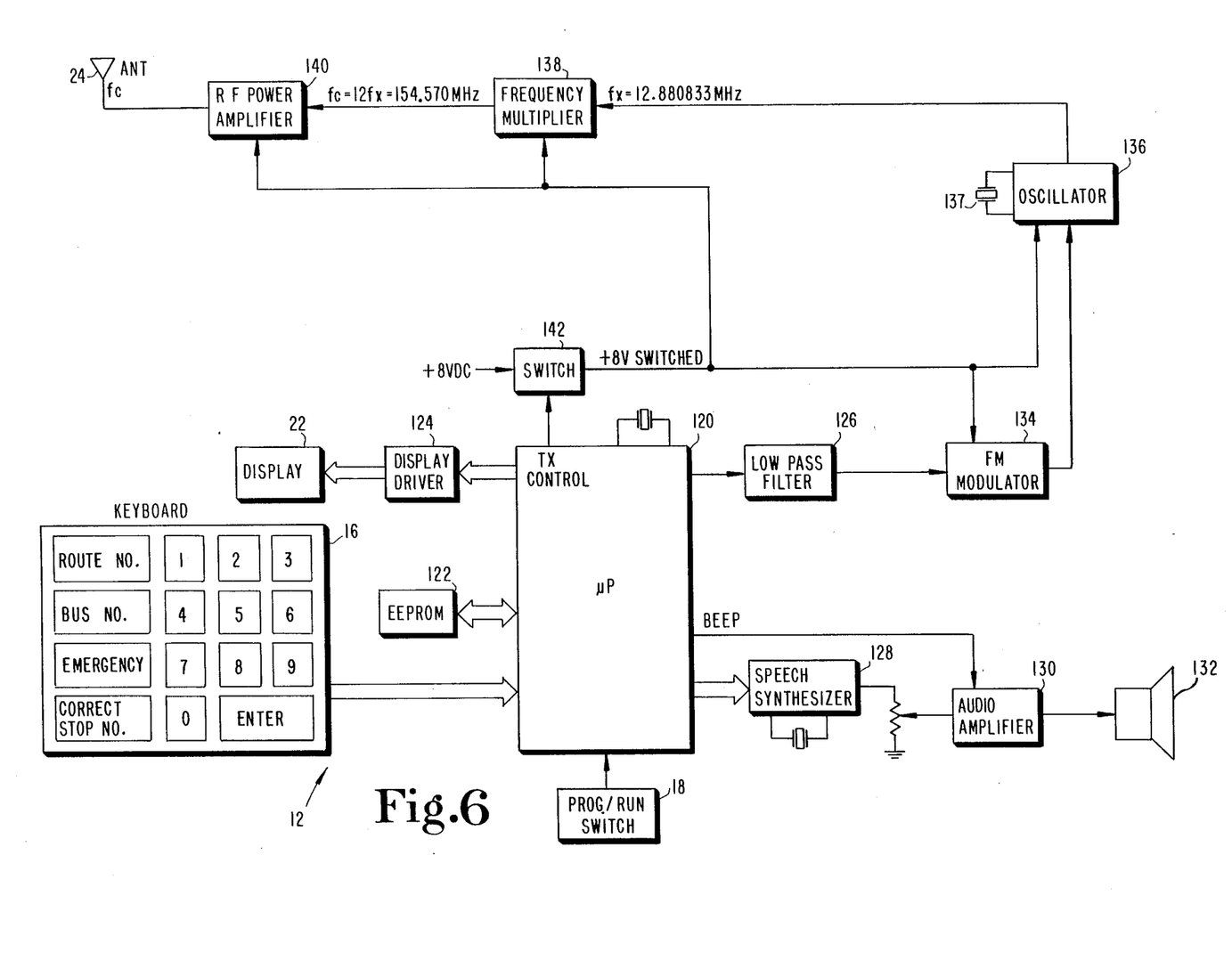
FIG. 6 shows a block diagram of the preferred embodiment of a transmitter according to the present invention.

Referring now to FIG. 6, the preferred embodiment of bus transmitter 12 is shown in block diagram form. Transmitter operation is controlled by the microprocessor 120 which is in turn controlled by a program stored in EEPROM 122. Microprocessor 120 has inputs from keyboard 16 and PROGRAM/RUN switch 18 and has an output to display 22 through display driver 124, a data word output to low-pass filter 126, an output to speech synthesizer 128, and a tone burst output on the BEEP line to audio amplifier 130. Microprocessor 120 operates, according to a program in internal ROM, to place data in one of the word formats shown in FIG. 5 and to serially transmit such assembled data words to low-pass filter 126 for transmission to alert monitors. Switch 18 is a slide switch determining whether the transmitter is in PROGRAM or RUN mode. Programming commands are entered into microprocessor 120 from keyboard 16. A route number, bus number, emergency number, and a stop number may be programmed in to the microprocessor. A bus number is programmed by pressing the BUS NUMBER key followed by a three-number sequence corresponding to the desired bus number. One-digit and two-digit numbers may be entered by pressing the desired numbers and then pressing the ENTER key. A route number is programmed by pressing the ROUTE key and then pressing the number key corresponding to the appropriate route number. Microprocessor 120 treats numbers 1–500 as valid bus numbers and numbers 1–8 as valid route numbers. Additionally, microprocessor 120 responds to an entered bus number 0 (zero) as bus number 501 representing the ALL CALL mode. Visual feedback of the keyboard actuations is provided by microprocessor 120 through display 22. Additionally, to provide audible feedback of the entry of new numbers, the microprocessor supplies a tone burst to audio amplifier 130 on the BEEP line to control the generation of a beep tone which is made audible through speaker 132.

When the PROGRAM/RUN switch 18 is in the RUN positio, transmitter 12 transmits its stored data beginning with transmission of a current location at stop zero. Microprocessor 120 supplies an outgoing data stream to low-pass filter 126 connected to FM modulator 134, which includues a varactor diode. The data bits control the capacitance of the varactor diode and thereby modulate a carrier frequency generated by crystal oscillator 136. This form of modulation is knon as frequency shift keying (FSK). The carrier frequency for oscillator 136 is 12.880833 MHz, as determined by crystal 137. The modulated carrier signal is supplied to frequency multiplier 138, which multiplies the incoming frequency by 12 resulting in an output carrier freqency of 154.570 MHz. The signal is amplified by RF power amplifier 140 and then supplied to antenna 24 for transmission. RF power amplifier 140, frequncy multiplier 138, oscillator 136, and FM modulator 134 receive switched 8 VDC power from electronic switch 142, which is controlled by microprocessor 120 so as to energize the transmitter circuitry only when ready to transmit.

A new transmission begins each time the stop number in memory is incremented. That is, a new data word 66 is transmitted at that time. Also at that time, microprocessor 120 supplies message data to speech synthesizer 128 to cause a current stop message to be announced ("Bus is at stop X"). The message data is supplied to the speech synthesizer only once each time the stop number is advanced, whereas the transmitter continues to transmit the same data word 66 at regular intervals. The transmitter provides the bus driver with confirmation of these regular transmissions by flashing particular display elements in display 22 each time a transmission is made.

During RUN mode, microprocessor 120 responds to all keys on keyboard 16 in the same manner: It advances the stop number in memory whenever any key is pressed. This latter feature enhances the convenience of the device to a bus driver who, for obvious safety reasons, should not take his eyes from the road anylonger than is absolutely necessary to perform required functions.

The transmitter control program provides for correction of the stop number in memory, as might be necessary if the stop number has been advanced accidently. Correction is accomplished in PROGRAM mode, using the CORRECT STOP NUMBER key. The microprocessor decrements the stored stop number each time the CORRECT STOP NUMBER key is pressed, and supplies the current stop number to display 22. The microprocessor and speech synthesizer used in transmitter 12 are the same as those used in alert monitor 10 and operate at the same clock frequencies. Similarly, the transmitter and alert monitor use the same type EEPROM.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for monitoring the location of a vehicle on a transportation route having a plurality of stops from a location proximate to a stop designated for said apparatus, said apparatus comprising:

(a) memory means for storing data corresponding to said designated stop and for storing initial stop data corresponding to a preselected stop prior to said designated stop on said route;

(b) receiver means for receiving and demodulating a modulated RF signal containing current stop data representing the current location of said vehicle;

(c) alert signal generating means for generating a unique alert signal for each stop between said preselected stop and said designated stop on said transportation route, said alert signal generating means including means for detecting current stop data which corresponds with said initial stop data and current stop data which corresponds with said designated stop data;

(d) a speech synthesizer, said speech synthesizer including means responsive to each unique alert signal for synthesizing a corresponding unique audio message;

(e) a speaker coupled to an output of said speech synthesizer;

wherein said receiver means is operative to receive and demodulate a modulated RF signal containing programming data which include said initial and designated stop data;

(f) means for coupling said current stop data and said initial and designated stop data from said receiver means to said memory means;

(g) means for accessing a current bus number, route number, and stop number in said current stop data and for accessing a bus number, first route number, initial stop number, and designated stop number in said programming data;

wherein said alert signal generating means generates a first unique alert signal if said current bus number, route number, and stop number match said bus number, first route number, and initial stop number, respectively, in said programming data, and generates a second unique alert signal if said current bus number, route number, and stop number match said bus number, first route number, and designated stop number, respectively, in said programming data;

(h) means for accessing a second route number, second initial stop number, and second designated stop number in said programming data;

wherein said alert signal generating means alternatively generates said first alert signal if said current bus number, route number, and stop number match said bus number, second route number, and second inital stop number, respectively, in said programming data, and alternatively generates said second alert signal if said current bus number, route number, and stop number match said bus number, second route number, and second designated stop number, respectively, in said programming data;

(i) means for identifying first, second, and third programming data words in said received programming data;

(j) means for interpreting first and second sequentially received portions of said first programming data word as a system number and a serial number, respectively;

(k) means for interpreting first, second, and third sequentially received portions of said second programming data word as said first route number, said second route number, and said bus number in said programming data, respectively; and (l) means for interpreting first, second, third, and fourth sequentially received portions of said third programming data word as said initial stop number for said first route number, said designated stop number for said first route number, said initial stop number for said second route number, and said designated stop number for said second route number, respectively.

2. The apparatus of claim 1 wherein said identifying means includes a microprocessor
   operative in response to a first state of an addres/data bit in a received programming data word to identify said received programming data word as said first programming data word;
   operative in response to a second state of said address/data bit to interpret another bit in said received programming data word as a type bit having first and second states;
   operative in response to said first state of said type bit to identify said received programming data word as said second programming data word; and
   operative in response to said second state of said type bit to identify said received programming data word as said third programming data word;
   and wherein said memory means includes an internal register bank in said microprocessor for storing said current stop data and a nonvolatile electronic memory external to said microprocessor for storing said programming data.

3. The apparatus of claim 2 further comprising:
   (m) means for interpreting first, second, and third sequentially received portions of said current stop data as said current bus number, route number, and stop number, respectively.

4. The apparatus of claim 1 wherein said identifying means includes
   means responsive to a first state of an address/data bit insaid received programming data for identifying a portion thereof as said first programming data word;
   means responsive to a second state of said address/data bit and a first state of a type bit in said received programming data for identifying a portion thereof as said second programming data word; and
   means responsive to said second state of said address/data bit and a second state of said type bit for identifying a portion of said received programming data as said third programming data word.

5. An apparatus for monitoring the location of a vehicle on a transportation route having a plurality of stops from a location proximate to a stop designated for said apparatus, said apparatus comprising:
   (a) memory means for storing data corresponding to said designated stop and to a preselected initial stop prior to said designated stop on said route, said data including a route number for said route, a bus number, a designated stop number, and an initial stop number, said memory means including means for storing a serial number identifying said apparatus;
   (b) receiver means for receiving and demodulating a modulated RF signal alternatively containing current stop data and programming data, said current stop data representing the current location of said vehicle and including a current route number, bus number, and stop number, said programming data including said designated and initial stop data;
   (c) alert signal generating means for generating a unique alert signal for each stop between said preselected stop and said designated stop on said transportation route, said alert signal generating means including means for detecting when said current route number, bus number, and stop number match said route number, bus number, and initial stop number, respectively, stored in said memory means, and when said current route number, bus number, and stop number match said route number, bus number, and designated stop number, respectively, stored in said memory means;
   (d) speaker means for producing a unique audible alert signal in response to each unique alert signal;
   (f) means for identifying first, second, and third programming data words in said received programming data;
   (g) means for interpreting a portion of said first programming data word as a serial number;
   (h) means for interpreting first and second sequentially received portions of said second programming data word as a route number and a bus number, respectively;
   (i) means for interpreting first and second sequentially received portions of said third programming data word as an initial alert stop number and a designated stop number in said received programming data from said receiver means to said memory means if said serial number in said first programming data word matches said serial number stored in said memory means.

6. The apparatus of claim 5 wherein said identifying means includes a microprocessor
   operative in response to a first state of an address/data bit in a received programming data word to identify said received programming data word as said first programming data word;
   operative in response to a second state of said address/data bit to interpret another bit in said received programming data word as a type bit having first and second states;
   operative in response to said first state of said type bit to identify said received programming data word as said second programming data word; and
   operative in response to said second state of said type bit to identify said received programming data word as said third programming data word.

7. The apparatus of claim 5 wherein said identifying means includes
   means responsive to a first state of an address/data bit insaid received programming data for identifying a portion thereof as said first programming data word;
   means responsive to a second state of said address/data bit and a first state of a type bit in said received programming data for identifying a portion thereof as said second programming data word; and
   means responsive to said second state of said address/data bit and a second state of said type bit for identifying a portion of said received programming data as said third programming data word.

8. A method of monitoring the location of a vehicle on a transportation route having a plurality of stops from a location proximate to a designated stop on said route, said method comprising the steps:
   (a) storing data corresponding to said designated stop and initial stop data corresponding to a preselected stop prior to said designated stop on said route in a memory;
   (b) receiving and demodulating a modulated RF signal containing current stop data representing the current location of said vehicle;

(c) generating a unique alert signal for each stop between said preselected stop and said designated stop on said transportation route, said alert signal generating step including detecting current stop data which corresponds with said initial stop data and current stop data which corresponds with said designated stop data; and (d) synthesizing a first unique audio message indicating the pressence of said vehicle at said preselected stop prior to said designated stop in response to a first unique alert signal and synthesizing a second unique audio message indicating the presence of said vehicle at said designated stop in response to a second unique alert signal;

(e) programming said memory remotely by receiving and demodulating a modulated RF signal containing programming data which include said initial and designated stop data, and by supplying said initial and designated stop data to said memory;

(f) interpreting first, second, and third sequentially received portions of said current stop data as a current bus number, route number, and stop number, respectively;

(g) identifying first, second, and third programming data words in said received programming data;

(h) interpreting a portion of said first programming data word as a serial number;

(i) interpreting first and second sequentially received portions of said second programming data word as a route number and a bus number, respectively;

(j) interpreting first and second sequentially received portions of said third programming data word as an initial alert stop number and a designated stop number, respectively, for said route number; and (k) coupling said route number, bus number, initial alert stop number, and designated stop number in said received programming data from said receiver means to said memory means if said serial number in said first programming data word matches said serial number stored in said memory means.

9. The method of claim 8 wherein said first unique alert signal is generated if said current bus number, route number, and stop number match said bus number, route number, and initial stop number, respectively, in said programming data, and wherein said second unique alert signal is generated if said current bus number, route number, and stop number, match said bus number, route number, and designated stop number, respectively, in said programming data.

* * * * *

UNITED STATES PATENT AND TRADEMARK OFFICE
CERTIFICATE OF CORRECTION

PATENT NO. : 4,713,661

DATED : December 15, 1987

INVENTOR(S) : Joseph E. Boone et al.

It is certified that error appears in the above-identified patent and that said Letters Patent is hereby corrected as shown below:

In the Abstract, line 13, insert --for-- after "allow".
In the Abstract, line 13, change "discharge" to --distance--.
In column 3, line 34, change "numbemrs" to --numbers--.
In column 4, line 2, change "." to --,--.
In column 8, line 65 change "positio" to --position--.
In column 9, line 4, change "knon" to --known--.
In column 9, line 9, change "freqency" to --frequency--.
In column 9, line 12, change "frequncy" to --frequency--.
In column 9, line 36, insert a space after "any".
In column 9, line 41, change "accidently" to --accidentally--.
In column 11, line 7, change "addres" to --address--.
In column 11, line 34, insert a space after "in".
In column 12, line 22, insert --, respectively, for said route number; and
    j) means for coupling said route number, bus number, initial alert stop number, and designated stop number-- after "number".
In column 12, line 46, insert a space after "in".
In column 13, line 9, change "pressence" to --presence--.

Signed and Sealed this

Thirty-first Day of May, 1988

Attest:

DONALD J. QUIGG

Attesting Officer

Commissioner of Patents and Trademarks